United States Patent [19]
Jornod et al.

[11] 4,368,502
[45] Jan. 11, 1983

[54] LEAD-LAG LOAD LOCKOUT CONTROL

[75] Inventors: Eugene R. Jornod, Caledonia; Steven D. Siden, Loves Park, both of Ill.

[73] Assignee: Barber-Colman Company, Rockford, Ill.

[21] Appl. No.: 260,249

[22] Filed: May 5, 1981

[51] Int. Cl.³ .......................................... H01H 47/00
[52] U.S. Cl. .................................... 361/192; 62/175; 165/28; 236/1 EA
[58] Field of Search ............... 361/161, 163, 165, 192; 165/28; 62/175; 236/1 EA; 307/39

[56] References Cited
U.S. PATENT DOCUMENTS 3,784,879 1/1974 Dukette .............................. 361/192
3,885,938 5/1975 Ordonez .......................... 236/1 EA
4,210,957 7/1980 Spethmann ................. 236/1 EA X Primary Examiner—Reinhard J. Eisenzopf
Attorney, Agent, or Firm—Robert M. Hammes, Jr.

[57] ABSTRACT

A lockout control system locks out the lag load upon occurrence of a predetermined condition in a dual load system set up in a lead-lag configuration. The lockout control system utilizes a lead-lag memory circuit for insuring that only the lag load is locked out when the lockout condition exists irrespective of which load is lead and which load is lag.

14 Claims, 3 Drawing Figures

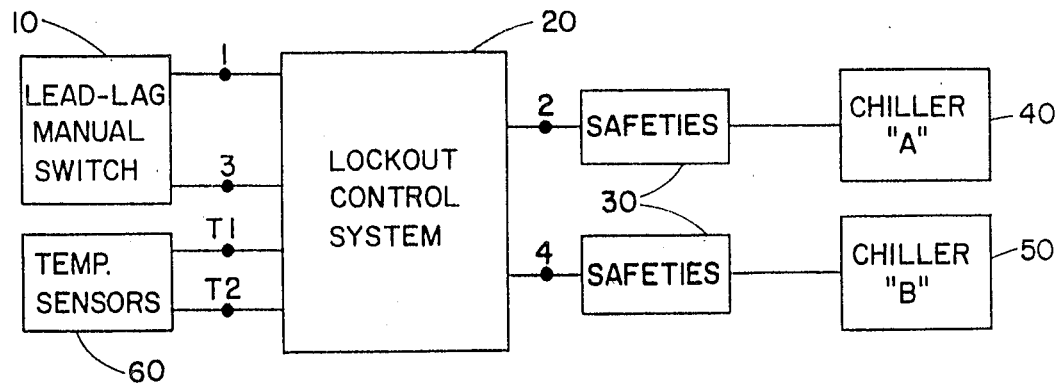
FIG. 1
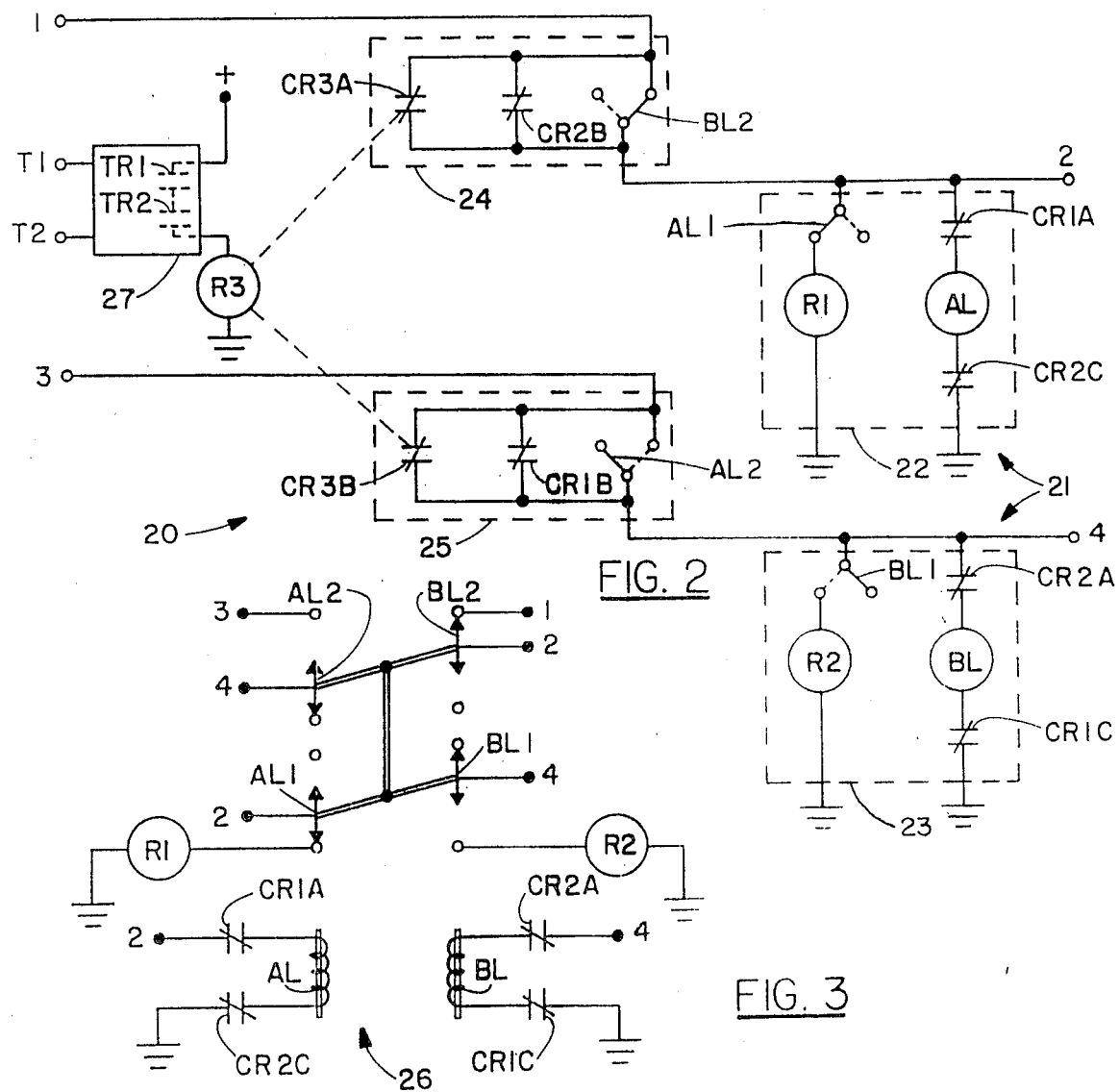
FIG. 2
FIG. 3

LEAD-LAG LOAD LOCKOUT CONTROL

BACKGROUND OF THE INVENTION

This invention concerns a control for automatically locking out the lag load in a dual load system arranged in a lead-lag configuration in order to prevent energization of the lag load when certain predetermined conditions exist. In addition, the lockout system desirably insures that the lag load is automatically deenergized when such predetermined conditions occur. Such action is desirable to insure economic energy utilization in systems in which multiple loads are sequentially energized in order to meet certain load capacity requirements.

For example, in large commercial buildings, a dual chiller system is frequently used for meeting the cooling requirements of the building. It is common to set up dual chillers in a lead-lag configuration such that the lead chiller is started first when a cooling demand is present. If the building load conditions require additional cooling, the lag chiller is then started. In many building systems, the lag chiller is manually started by the building equipment operator. The operator's decision to start the chiller is generally based upon his experience concerning what conditions are appropriate for starting the lag chiller. In many instances, this human factor results in the lag chiller being started when the actual cooling demand does not require this additional capacity. Consequently, energy is wasted. Similarly, when both chillers are operating the operator will ultimately determine when the cooling requirements are such that the lag chiller can be deenergized. In some cases the human factor can also result in wasted energy.

It is thus desirable to provide an automatic lockout control system which will eliminate the inherent energy waste which results in manual energization and deenergization of the lag chiller.

SUMMARY OF THE INVENTION

A lockout control system according to the invention employs a lockout circuit associated with each load, each lockout circuit comprising a plurality of switches in parallel such that all switches in a given lockout circuit must be open in order to lockout the associated load. In such case energization of the load is prevented or, alternatively, the load is deenergized if the lockout conditions occur when both loads are operating. The lockout control system further includes a lead-lag memory circuit which stores the identification of the lead load and the lag load when the lead load is initially energized. The memory circuit operates to insure that all switches in the lockout circuit associated with the lag load are open except for a lockout control switch. Operation of the lockout control switch in such lockout circuit is controlled by a lockout control relay which operates to open the lockout control switch in each lockout circuit when the predetermined lockout conditions exist. Thus, when the lockout conditions exist all switches in the lag load lockout circuit will be open and energization of the lag load is precluded.

A more thorough understanding of the invention can be obtained from the following detailed description taken in conjunction with the drawing figures.

BRIEF DESCRIPTION OF THE DRAWINGS

FIG. 1 is a block diagram of a dual chiller lead-lag system including a lockout control system according to the invention.

FIG. 2 is a schematic diagram of the preferred embodiment of the lockout control system according to the invention.

FIG. 3 is a schematic diagram of a dual coil latching relay memory circuit which may be employed in the preferred embodiment of the invention shown in FIG. 2.

DETAILED DESCRIPTION OF THE INVENTION

While the invention will be described with respect to a dual chiller system, it should be understood that the invention can be utilized in conjunction with other types of energy utilizing loads arranged to operate in a lead-lag configuration.

Referring now to FIG. 1, a typical lead-lag dual chiller system is shown in which lead-lag manual switch 10 is connected in series with safeties 30 which are in turn connected in series to chiller "A" 40 and chiller "B" 50. In operation, the lead chiller which will be assumed to be chiller "A" 40 for purposes of discussion, is started first and subsequently lag chiller "B" 50 is energized by operation of manual switch 10. According to the invention, a lockout control system 20 is placed in series between lead-lag manual switch 10 and safeties 30, lead-lag manual switch 10 being connected to lockout control input terminals 1, 3 and safeties 30 being connected to lockout control output terminals 2, 4.

Lockout control system 20 is designed to lock out the lag chiller, whether it be chiller "A" 40 or chiller "B" 50, upon the occurrence of certain predetermined conditions. For example, it may be desirable to establish the lockout condition based upon two variables such as the temperature of discharge air in the air conditioning system and the temperature of the outside air. In such case, the lockout condition could exist if the outside air temperature is below a predetermined minimum, such as 52° F., and the discharge air is below a different predetermined minimum, such as 78° F. In such case, the lag chiller would be locked out only when both the outside air temperature and discharge air temperature are below their respective predetermined minimum temperatures. It would be readily apparent that any desired lockout conditions could be established for the lockout control system 20. The operation of lockout control system 20 is described with respect to a system in which the predetermined lockout conditions are established with respect to sensed discharge air temperature and outside air temperature as described above.

As shown in FIG. 1, temperature sensors 60 are connected to lockout control system 20 at sensor input terminals T1, T2. Temperature sensor 60 can be of any suitable type and provides electrical signals proportional to sensed discharge air temperature and outside air temperature. Thus, temperature sensor 60 will provide signals to lockout control system 20 indicative of the predetermined lockout condition when sensed outside air temperature and discharge air temperature are both less than their respective predetermined minimum temperatures.

Referring now to FIG. 2, the preferred embodiment of lockout control system 20 utilizes a memory circuit generally indicated at 21 for storing the identification of the lead and lag chillers. Memory circuit 21 comprises a pair of memory relay circuits 22, 23 associated respectively with chiller "A" and chiller "B" through respective output terminals 2, 4. Lockout control system 20 further comprises lockout circuits 24, 25 associated respectively with chillers "A" and "B" and connected between input terminals 1, 3 and output terminals 2, 4 as shown. Each of lockout circuits 24, 25 comprise a plurality of switches in parallel (described in more detail below) which are operated to provide either open or closed circuits for energization of their respective chillers depending upon existence or non-existence of the lockout condition. Lockout control system 20 further comprises a lockout control means, such as sensed condition logic control 27, which provides a signal to lockout circuits 24, 25 corresponding to the existence or non-existence of the predetermined lockout condition.

In the preferred embodiment a plurality of relays AL, BL, R1, R2 and R3 are utilized to operate various switches, some of which comprise relay contacts. The operative relationship between relay R3 and its associated relay contacts CR3A and CR3B is indicated by means of dotted lines in FIG. 2. For purposes of clarity in the drawing, the dotted lines are not shown with respect to the other relays and their associated switches and relay contacts.

Lockout circuit 24 comprises a chiller switch BL2 in series between input terminal 1 and output terminal 2, normally closed chiller lockout relay contacts CR2B in parallel with switch BL2, and normally closed lockout control relay contacts CR3A in parallel with both switch BL2 and relay contacts CR2B. Similarly, lockout circuit 25 comprises a chiller switch AL2 in series between input terminal 3 and output terminal 4, normally closed chiller lockout relay contact CR1B in parallel with switch AL2, and normally closed lockout control relay contacts CR3B in parallel with both switch AL2 and relay contacts CR1B.

Memory relay circuit 22 comprises latching relay AL connected between switch BL2 and output terminal 2 and in series between switch BL2 and ground. Normally closed relay contacts CR1A are contacted in series between switch BL2 and latching relay AL. Normally closed relay contacts CR2C are connected in series between latching relay AL and ground. In addition, memory relays circuit 22 comprises lockout relay R1 connected in series between switch BL2 and ground, an associated lockout relay switch AL1 being connected in series between switch BL2 and relay R1. Similarly, memory relay circuit 23 comprises latching relay BL connected between switch AL2 and output terminal 4 and in series between switch AL2 and ground. Normally closed relay contacts CR2A are connected in series between switch AL2 and latching relay BL. Normally closed relay contacts CR1C are connected in series between latching relay BL and ground. Memory relay circuit 23 additionally comprises lockout relay R2 connected in series between switch AL2 and ground, an associated switch BL1 being connected in series between switch AL2 and lockout relay R2.

In the embodiment of the sensed condition logic control 27 shown in FIG. 2, two sets of normally open relay contacts TR1, TR2 are connected in series between positive and ground. Relay R3 is connected in series between relay contacts TR2 and ground. If it is assumed that the discharge air temperature lockout signal is provided to logic control 27 at terminal T1 and the outside air temperature lockout condition signal is provided at terminal T2, and it is further assumed that the signal at terminal T1 operates contacts TR1 and the signal at terminal T2 operates contacts TR2, the operation of the logic control 27 is as follows. When the discharge air temperature is below the predetermined minimum temperature contacts TR1 are closed. Similarly, when the outside air temperature is below the minimum predetermined temperature contacts TR2 are closed. In such case the lockout condition exists and relay R3 is energized since a closed circuit exists through contacts TR1 and TR2. If either sensed temperature is above its predetermined minimum, at least one of contacts TR1 and TR2 will be open and relay R3 will not be energized.

In the foregoing circuits the relays operate associated relay contacts and switches to accomplish the desired control functions of the lockout control system 20. When lockout control relay R3 is energized it operates to open lockout control relay contacts CR3A, CR3B in respective lockout circuits 24, 25. When lockout relay R1 is energized it operates to open relay contacts CR1A, chiller lockout contacts CR1B, and relay contacts CR1C. Similarly, when lockout relay R2 is energized it operates to open relay contact CR2A, lockout contact CR2B, and relay contact CR2C. When latching relay AL is energized, lockout relay switch AL1 is closed and chiller switch AL2 is opened. Similarly, when latching relay BL is energized, lockout relay switch BL1 is closed and chiller switch BL2 is opened.

While latching relays AL and BL can operate independently, in the preferred embodiment latching relays AL and BL comprise a dual coil latching relay which is shown schematically in FIG. 3. In the drawing, switches AL1, AL2, BL1, BL2 are depicted as being linked together such that energization of either relay coil AL or relay coil BL results in all of the switches moving simultaneously from one state to another state. Thus, when coil relay AL is energized the switches move to the states shown in FIG. 3. That is, switch AL1 is closed, switch AL2 is open, switch BL1 is open and switch BL2 is closed. It will be noted that this corresponds to the states of the various switches are shown in FIG. 2. Conversely, when relay coil BL is energized all of the switches will move to their opposite states such that switch AL1 will now be open, switch AL2 closed, switch BL1 closed and switch BL2 open.

Operation of the lockout control system 20 will now be described. If it is assumed that the lead chiller is chiller "A," when chiller "A" is energized latching relay AL is also energized resulting in opening of chiller "B" switch contacts AL2 and closing of lockout relay switch AL1 which in turn results in energization of lockout relay R1. Memory circuit relay contacts CR1A and CR1C are opened by lockout relay R1 thus preventing further actuation of the latching relay until power is turned off. Energization of lockout relay R1 also results in opening of chiller lockout contacts CR1B. With the circuit in this condition the operation of lockout control relay contacts CR3B determines whether chiller B can be energized. If the sensed outside air temperature and the discharge air temperature are such that lockout conditions are not present, chiller "B" can be energized in the event additional cooling capacity is desired since relay contacts CR3B will remain in the normally closed state. However, if the lockout condition exists as determined by logic control 27 lockout control relay R3 will be energized and normally closed lockout control relay contacts CR3B will open so as to prevent energization of chiller "B." If chiller "B" is operating at the time the lockout conditions occur, chiller "B" will be deenergized due to the opening of relay contacts CR3B.

In the event chiller "B" happens to be the lead chiller upon start up, a similar but opposite switching sequence takes place so that memory circuit 21 identifies chiller "A" as the lag chiller which will be locked out when the lockout conditions are present. That is, relay coil BL will be energized when chiller "B" is started so that switch AL1 is open, switch AL2 is closed, switch BL1 is closed and switch BL2 is opened. Lockout relay R2 will be energized resulting in opening of relay contacts CR2A, CR2B and CR2C. In such event, energization of lockout control relay R3 will open lockout control relay contact CR3A so that chiller "A" is locked out when lockout conditions exist.

It will be readily apparent to those skilled in the art that alternate embodiments of the invention can be provided without departing from the scope and spirit of the invention as described. Consequently, the invention is not limited to the particular embodiment described but rather is limited solely by the claims.

We claim:

1. A lead-lag load lockout control system for automatically locking out the lag load in a dual load system set up in a lead-lag configuration, and lockout control system comprising:
   a first lockout circuit associated with a first load and comprising in parallel a first load switch, a first lockout switch, and a first lockout control switch;
   a second lockout circuit associated with a second load and comprising in parallel a second load switch, a second lockout switch, and a second lockout control switch;
   a lead-lag memory circuit for storing lead load and lag load identification during system operation comprising a first memory relay circuit connected between said first lockout circuit and a first output terminal and operable to open said second load switch and said second lockout switch when said first load is the lead load, and a second memory relay circuit connected between said second lockout circuit and a second output terminal and operable to open said first load switch and said first lockout switch when said second load is the lead load; and
   a lockout control means for selectively opening the lead load lockout control switch in response to a predetermined condition.

2. A lockout control system according to claim 1, wherein said lockout control means selectively opens both said first and second lockout control switches in response to a predetermined condition.

3. A lockout control system according to claim 1 wherein said first memory relay circuit comprises: a first switch and a first latching relay connected in series between said first load switch and ground; a first lockout relay switch and a first lockout relay connected in series between said first load switch and ground; said first latching relay operable to close said first lockout relay switch and open said second load switch upon energization; and said first lockout relay operable to open said first switch and said second lockout switch upon energization.

4. A lockout control system according to claim 3 wherein said second memory relay circuit comprises: a second switch and a second latching relay connected in series between said second load switch and ground; a second lockout relay switch and a second lockout relay connected in series between said second load switch and ground; said second latching relay operable to close said second lockout relay switch and open said first load switch upon energization; and said second lockout relay operable to open said second switch and said first lockout switch upon energization.

5. A lockout control system according to claim 4 wherein said first memory relay circuit additionally comprises a third switch connected in series between said first latching relay and ground, said second lockout relay operable to open said third switch upon energization.

6. A lockout control system according to claim 5 wherein said first, second and third switches comprise normally closed relay contacts.

7. A lockout control system according to claim 4 wherein said second memory circuit additionally comprises a fourth switch connected in series between said second latching relay and ground, said first lockout relay operable to open said fourth switch upon energization.

8. A lockout control system according to claim 7 wherein said fourth switch comprises normally closed relay contacts.

9. A lockout control system according to claim 4 wherein said first and second latching relays comprise a dual coil latching relay having first and second coils, said first coil operating upon energization to close said first lockout relay switch and said first load switch and to open said second lockout relay switch and said second load switch.

10. A lockout control system according to claim 9 wherein said second coil operates upon energization to close said second lockout relay switch and said second load switch and to open said first lockout relay switch and said first load switch.

11. A lockout control system according to claim 1 wherein said lockout control means comprises a relay energized in response to said predetermined condition.

12. A lockout control system according to claim 11 wherein said lockout control means additionally comprises a logic control which determines existence of said predetermined condition in response to a plurality of sensed conditions.

13. A lockout control system according to claim 11 wherein said first and second lockout control switches comprise normally closed relay contacts.

14. A lockout control system according to claim 1 wherein said first and second lockout switches comprise normally closed relay contacts.

* * * * *